(12) United States Patent
Fisher (10) Patent No.: US 9,024,578 B2
(45) Date of Patent: May 5, 2015

(54) ALIGNMENT SYSTEM FOR WIRELESS ELECTRICAL POWER TRANSFER

(71) Applicant: Delphi Technologies, Inc., Troy, MI (US)

(72) Inventor: Scott F. Fisher, Niles, OH (US)

(73) Assignee: Delphi Technologies, Inc., Troy, MI (US)

( * ) Notice: Subject to any disclaimer, the term of this patent is extended or adjusted under 35 U.S.C. 154(b) by 428 days.

(21) Appl. No.: 13/677,362

(22) Filed: Nov. 15, 2012

(65) Prior Publication Data

US 2014/0132207 A1 May 15, 2014

(51) Int. Cl.
*H01M 10/46* (2006.01)
*H02J 7/00* (2006.01)

(52) U.S. Cl.
CPC .................................... *H02J 7/0052* (2013.01)

(58) Field of Classification Search
CPC ......... H02J 5/005; H02J 7/025; H02J 7/0027; H02J 7/0042
USPC .................................. 320/104, 107, 108, 109
See application file for complete search history.

(56) References Cited

U.S. PATENT DOCUMENTS

| | | | |
|---|---|---|---|
| 5,406,395 | A | 4/1995 | Wilson et al. |
| 5,498,948 | A | 3/1996 | Bruni et al. |
| 7,573,402 | B2 | 8/2009 | Herbert et al. |
| 8,008,888 | B2 | 8/2011 | Oyobe et al. |
| 2002/0140576 | A1 | 10/2002 | Simon |
| 2007/0126395 | A1 | 6/2007 | Suchar |
| 2007/0131505 | A1 | 6/2007 | Kim |
| 2010/0207771 | A1* | 8/2010 | Trigiani ........................ 320/108 |
| 2011/0181240 | A1 | 7/2011 | Baarman et al. |
| 2011/0254503 | A1 | 10/2011 | Widmer et al. |
| 2012/0091959 | A1 | 4/2012 | Martin et al. |
| 2012/0095617 | A1 | 4/2012 | Martin |
| 2012/0098483 | A1 | 4/2012 | Patel |
| 2012/0146576 | A1* | 6/2012 | Partovi ......................... 320/108 |
| 2012/0223589 | A1 | 9/2012 | Low et al. |

(Continued)

FOREIGN PATENT DOCUMENTS

WO 2011/116394 9/2011

OTHER PUBLICATIONS

International Search Report dated Nov. 1, 2013.
Prigge, Eric A.; "A Positioning System With No Line-Of-Sight Restrictions for Cluttered Environments"; Draft Rev. 2, Aug. 2004; 176 pages.

(Continued)

*Primary Examiner* — Edward Tso
(74) *Attorney, Agent, or Firm* — Robert J. Myers (57) ABSTRACT

A system to provide alignment between a source resonator and a capture resonator. The source resonator is configured to emit a magnetic charging signal or a magnetic beacon signal. The source resonator is coupled to an electrical power source that provides current to the source resonator. The source resonator emits the charging signal when the current exceeds a first threshold and emits the beacon signal when the current is below a second threshold. The capture resonator is configured to receive the charging signal and provide electrical power based on the charging signal. The system also includes a magnetic sensor configured to receive the beacon signal and provide a location signal indicative of a relative location between the transmit and capture resonators to a controller that provides an alignment signal indicative of a movement required to align the source resonator and the capture resonator.

20 Claims, 4 Drawing Sheets

(56) References Cited

U.S. PATENT DOCUMENTS

2012/0262002 A1 10/2012 Widmer et al.
2014/0132208 A1* 5/2014 Fisher .......................... 320/108

OTHER PUBLICATIONS

Shladover, et al. "Demonstration of Automated Heavy-Duty Vehicles"; California PATH Research Report UCB-ITS-PPR-2005-23; ISSN 1055-1425; Jun. 2005, 459 pages.

* cited by examiner

ALIGNMENT SYSTEM FOR WIRELESS ELECTRICAL POWER TRANSFER

TECHNICAL FIELD OF INVENTION

The invention generally relates to wireless electrical power transfer between a source resonator and a capture resonator, and more particularly relates to a system to align a source resonator to a capture resonator using a magnetic beacon signal emitted by the source resonator.

BACKGROUND OF INVENTION

Electric vehicles and electric-hybrid vehicles are gaining in popularity with consumers. The electric motors in these vehicles are typically powered from multiple storage batteries disposed in a battery pack in the vehicle. If the battery needs to be recharged while the vehicle is parked, a wired coupling device is connected to the vehicle, typically by the vehicle operator. However, some operators object to having to 'plug-in' their vehicle each time the vehicle is parked.

Wireless or connector less battery chargers have been proposed, see U.S. Pat. No. 5,498,948 issued Mar. 12, 1996 to Bruni et al. and U.S. Pat. No. 8,008,888 issued Aug. 30, 2011 to Oyobe et al. A known wireless battery charger includes a source resonator or charging pad lying on a parking surface under the vehicle being charged, and a corresponding capture resonator mounted on the underside of the vehicle. Such wireless battery chargers are most efficient when the vehicle is parked such that the source resonator and capture resonator are horizontally (i.e. laterally and longitudinally) aligned. However, as the source resonator and the capture resonator may be underneath the vehicle and/or out of the vehicle operator's view, it is difficult for the vehicle operator to judge where to park the vehicle so that the source resonator and the capture resonator are aligned.

Some current wireless charging systems rely on methods to align the capture resonator attached to the underside of a vehicle with its corresponding source resonator using trial and error positioning for the vehicle relative to the source resonator. These methods are time intensive, with poor repeatable results. Other wireless charging systems utilize wheel stops to align the capture resonator on the vehicle with the source resonator. While these systems may provide precise alignment for one particular vehicle configuration, they are unlikely to provide adequate alignment for a wide variety of vehicles wherein the spatial relationship between the wheels and capture resonator differ.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment of this invention, a system to provide alignment between a source resonator and a capture resonator is provided. The system includes a source resonator configured to emit a magnetic signal selected from a group consisting of a charging signal and a beacon signal and a capture resonator configured to wirelessly receive the charging signal and provide electrical power based on the charging signal. The system further includes a magnetic sensor configured to wirelessly receive the beacon signal and provide a location signal based on the beacon signal that is indicative of a relative location between the source resonator and the capture resonator. The system also includes a controller in communication with the magnetic sensor, the controller configured to receive the location signal and provide an alignment signal indicative of a movement required to align the source resonator and the capture resonator. The source resonator is coupled to an electrical power source that provides an electric current to the source resonator.

The source resonator emits the charging signal when a magnitude of the electric current exceeds a first current threshold. The source resonator emits the beacon signal when the magnitude of the electric current is below a second current threshold. The first current threshold may be substantially higher than the second current threshold. The magnitude of the electric current may be constant when the source resonator emits the beacon signal and the magnitude of the electric current may be time-variant when the source resonator emits the charging signal. The beacon signal may be pulse modulated. Alternately, the magnitude of the electric current may be time-variant when the charging signal and the beacon signal are emitted, wherein a charging signal frequency is substantially higher than a beacon signal frequency. The beacon signal frequency may not be a resonant frequency of the capture resonator. The beacon signal may be frequency modulated.

The capture resonator and the magnetic sensor may be disposed on a vehicle. The electrical power provided by the capture resonator may charge a battery disposed within the vehicle. The system may further include an array of magnetic sensors disposed on the vehicle, wherein the array of magnetic sensors provides a plurality of output signals. The controller may be further configured to determine a relative position between the source resonator and the capture resonator by processing the plurality of output signals. A first portion of the array of magnetic sensors may be disposed on the vehicle forward of the capture resonator and a second portion of the array of magnetic sensors may be disposed on the vehicle rearward of the capture resonator. The system may further include a display in communication with the controller. The display may provide a graphic indication of the movement required by the vehicle to align the capture resonator and the source resonator, based on the alignment signal.

In another embodiment of the present invention, a device configured to provide a signal for locating a source resonator relative to a capture resonator is provided. The device includes an electrical power source that provides an electric current and a source resonator coupled to the electrical power source to receive the electric current. The source resonator is configured to transmit a magnetic charging signal to a capture resonator that wirelessly receives the magnetic charging signal and provides electrical power based on the magnetic charging signal. The source resonator is also configured to transmit a magnetic beacon signal to a magnetic sensor that wirelessly receives the magnetic beacon signal and provides a location signal based on the magnetic beacon signal that is indicative of a relative location between the source resonator and the capture resonator. The source resonator emits the magnetic charging signal when a magnitude of the electric current exceeds a first current threshold and the source resonator emits the magnetic beacon signal when the magnitude of the electric current is below a second current threshold.

The first current threshold may be substantially higher than the second current threshold. The magnitude of the electric current may be constant when the source resonator emits the magnetic beacon signal and the magnitude of the electric current may be time-variant when the source resonator emits the magnetic charging signal. The magnetic beacon signal may be pulse modulated and the magnetic charging signal may be amplitude modulated. Alternatively, the magnitude of the electric current may be time-variant and a charging signal frequency may be substantially higher than a beacon signal frequency. The magnetic beacon signal may be frequency modulated. The device may be configured to transmit the magnetic charging signal to a capture resonator that is disposed in a vehicle and transmit the magnetic beacon signal to a magnetic sensor that is disposed in the vehicle.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Described herein is a system for aligning a source resonator and a capture resonator, such as those used in an electric vehicle charging system, in order to maximize the efficiency of electrical power transfer between the source resonator and the capture resonator. The source resonator emits a magnetic charging signal that may be amplitude modulated at a resonant frequency of the source resonator and the capture resonator. The charging signal is transmitted to the capture resonator wherein the charging signal induces an electric current. This system also uses the source resonator to transmit a magnetic beacon signal to direct the user to align the capture resonator with the source resonator. This may be achieved by running a comparatively low current through the source resonator to produce a magnetic field. The current may be such that the magnetic field of the beacon signal is either constant, pulsed, or at a frequency much lower than the charging signal such that it creates the optimum signal for a magnetic field sensing device.

Figure 1:
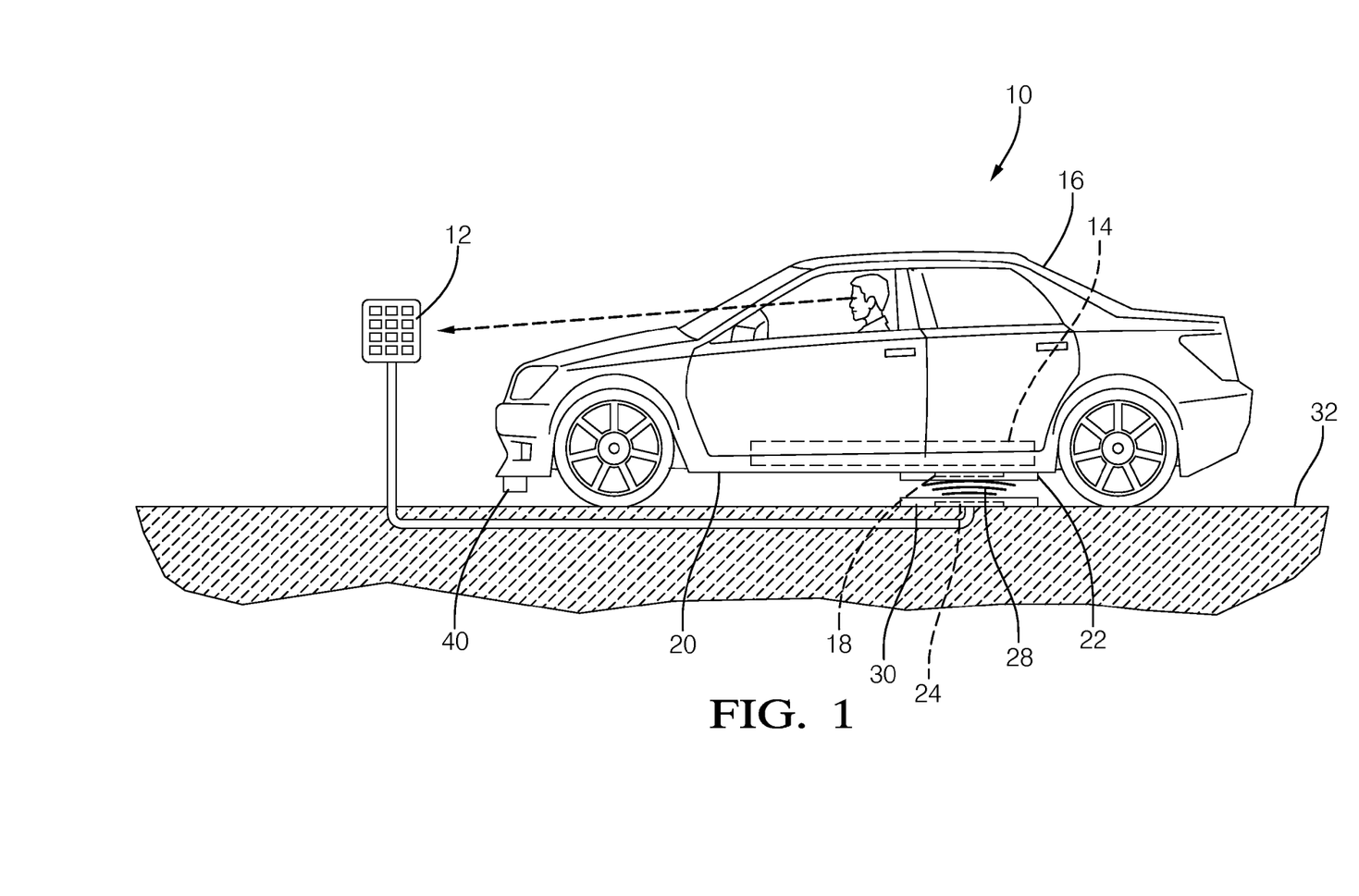
FIG. 1 is a side view of a system to align a source resonator and a capture resonator in accordance with one embodiment.

FIG. 1 illustrates a non-limiting example of a system 10 for aligning a source resonator and a capture resonator. The system 10 may be part of a wireless battery charger 12 for charging a battery 14 in a vehicle 16. The system 10 includes a capture resonator 18 attached to the vehicle 16. The capture resonator 18 in this non-limiting example is located on the underside 20 of the vehicle 16. The capture resonator 18 may be packaged inside of a receive pad 22 that is designed to isolate the capture resonator 18 from environmental factors such as dust, dirt, and moisture.

Figure 2:
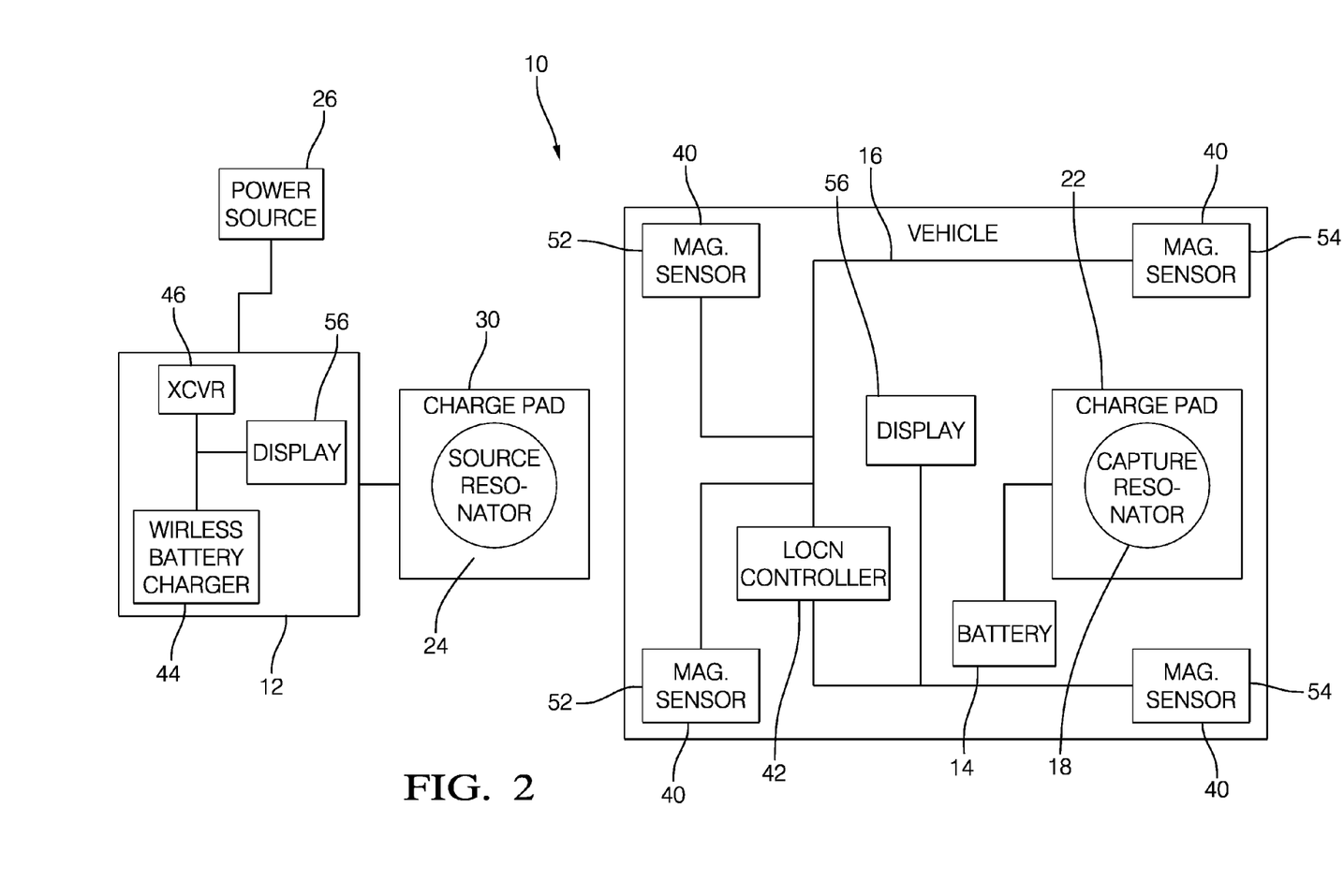
FIG. 2 is a block diagram of the system to align a source resonator and a capture resonator of FIG. 1 in accordance with one embodiment.

As illustrated in the non-limiting example of FIG. 2, the system 10 also includes a source resonator 24 that is coupled to an electrical power source 26 that provides an electric current to the source resonator 24. The source resonator 24 is configured to emit a magnetic charging signal 28 based on the electric current supplied by the power source 26.

Referring again to FIG. 1, the source resonator 24 may be packaged inside of a charge pad 30 that is designed to isolate the source resonator 24 from environmental factors such as dust, dirt, and moisture. The charge pad 30 may reside on a parking surface 32 under the vehicle 16. The parking surface 32 may be inside a garage owned by the owner of the vehicle 16, or may be in a public parking lot that provides electric vehicle 16 recharging services. The capture resonator 18 is configured to wirelessly receive the charging signal 28 and provide electrical power based on the charging signal 28 from the source resonator 24.

It should be appreciated that the more closely the capture resonator 18 is aligned with the source resonator 24, the more efficiently the energy is transferred from the source resonator 24 to the capture resonator 18. Furthermore, it should be appreciated that since the capture resonator 18 and the source resonator 24 may be underneath the vehicle 16, it may be difficult for an operator to maneuver the vehicle 16 to a position where the capture resonator 18 is longitudinally and laterally aligned with source resonator 24. As used herein and illustrated in FIG. 3, a longitudinal direction 34 is along an X axis and a lateral direction 36 is along a Y axis as according to the coordinate system defined by Society of Automotive Engineers (SAE) standard J670. By way of example and not limitation, the vertical separation between the capture resonator 18 and the source resonator 24 is typically about fifteen centimeters to twenty centimeters (15-20 cm).

Figure 3:
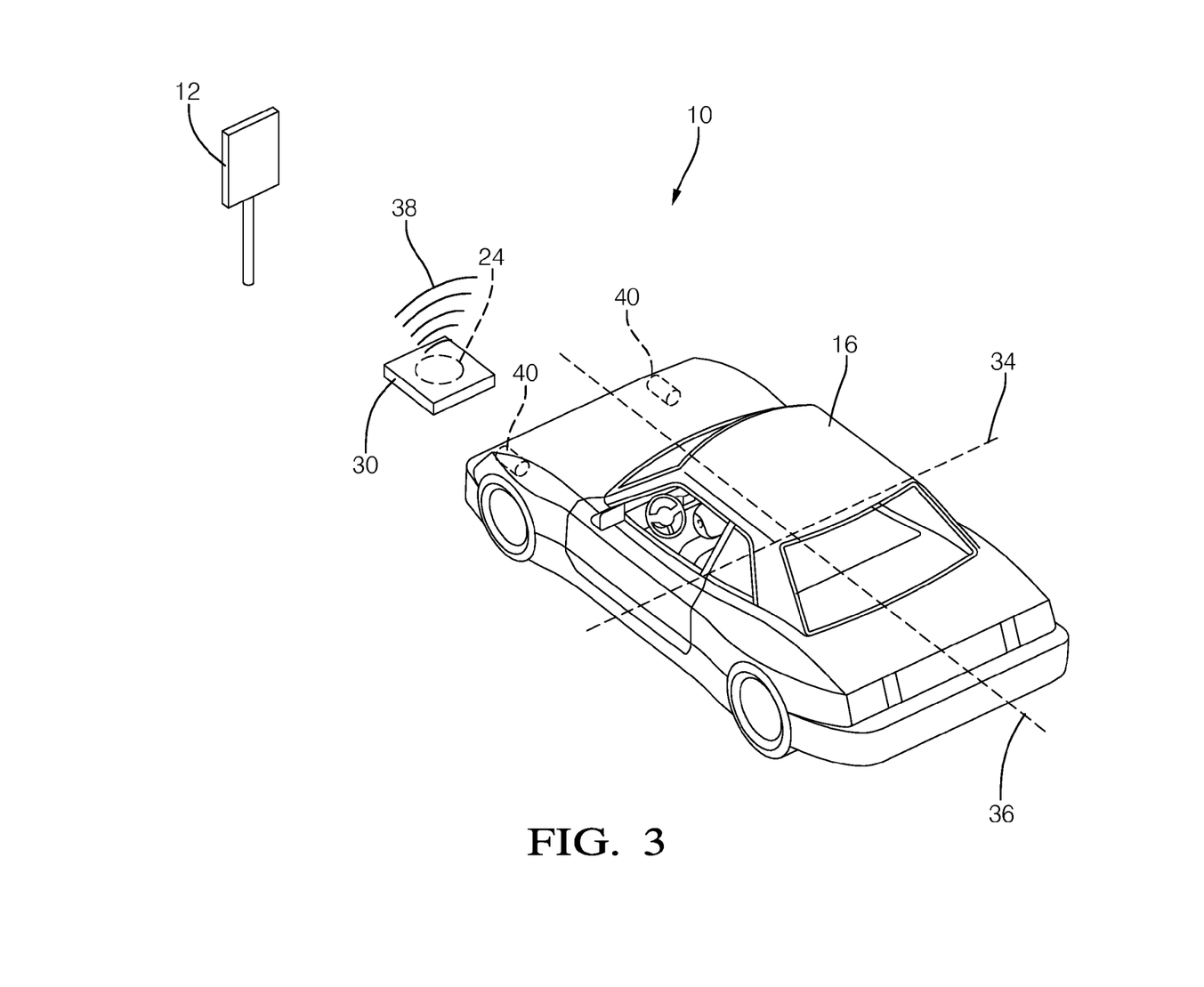
FIG. 3 is a perspective view of the system to align a source resonator and a capture resonator of FIG. 1 being used to park the vehicle in accordance with one embodiment.

As illustrated in the non-limiting example in FIG. 3, the source resonator 24 also emits a magnetic beacon signal 38. The source resonator 24 emits the charging signal 28 when electric current flowing through the source resonator 24 is high, for example above 10 amperes. That is, when the magnitude of the electric current exceeds a first current threshold. The source resonator 24 emits the beacon signal 38 when the current flowing through the source resonator 24 is low, for example less than 1 amperes. That is, when the magnitude of the electric current is below a second current threshold. Because the beacon signal 38 may be transmitted when the source resonator 24 may be exposed, e.g. not underneath the vehicle, the current flowing through the source resonator 24 should be low enough such that the beacon signal 38 emitted is at or below applicable International Committee on Non-ionizing Radiation Protection (ICNIRP) guidelines. The first current threshold may be substantially higher than the second current threshold. As used herein, substantially higher means that the peak magnitude of the first current threshold exceeds the peak magnitude of the second current threshold by more than 5 amperes. Therefore, the source resonator 24 emits both the charging signal 28 and the beacon signal 38 without the need to include additional components. It should be understood that the values of the current supplied to the source resonator 24 to cause the source resonator 24 to emit the charging signal or the beacon signal may vary with the design and application of the source resonator 24.

Other systems for aligning a capture resonator and a source resonator, such as the one shown in United States Patent Application No. 2012/0095617 published Apr. 19, 2012 by Martin, the entire disclosure of which is hereby incorporated by reference, have shown an additional RF transmitter located inside of the charge pad to transmit an RF beacon signal from the location of the source resonator to an RF receiver in the vehicle.

Transmitting the beacon signal 38 using only the source resonator 24 eliminates the cost of adding an additional RF transmitter to the charge pad 30 to transmit an RF beacon signal and eliminates the cost of circuitry between the charging controller 44 and the RF transmitter. Using the source resonator 24 to transmit the beacon signal 38 also eliminates the complications of designing an RF transmitter that is capable of withstanding the environment inside the charge pad 30 (e.g. high level magnetic fields, high/low temperature, moisture).

The beacon signal 38 is wirelessly transmitted to a magnetic sensor 40 that is configured to wirelessly receive the beacon signal 38. The magnetic sensor 40 provides a location signal based on the beacon signal 38. The location signal is indicative of a relative location between the source resonator 24 and the capture resonator 18. As illustrated in FIG. 1, the magnetic sensor 40 may also be attached to the vehicle 16. The magnetic sensor 40 may be a three axis fluxgate magnetometer, such as a Model 535 available from Applied Physics Systems of Mountain View, Calif. The magnetic sensor 40 may alternatively be a magnetoresistive sensor such as a Model HMC1053 available from Honeywell International Inc. of Plymouth, Minn.

As illustrated in FIG. 2, the system 10 further includes a controller 42 in communication with said magnetic sensor 40, hereafter referred to as the location controller 42. The location controller 42 is configured to receive the location signal and provide an alignment signal that indicates a lateral movement, longitudinal movement, or combination of the two required of the vehicle 16 to align the source resonator 24 and the capture resonator 18. The location controller 42 may include a processor (not shown) such as a microprocessor or other control circuitry as should be evident to those in the art. The location controller 42 may also include analog to digital convertor circuitry and digital to analog convertor circuitry (not shown) to be able to communicate with the magnetic sensor 40 and other sensors or circuitry (not shown) that may be included in the system 10. The location controller 42 may also include memory (not shown), including non-volatile memory, such as electrically erasable programmable read-only memory (EEPROM) for storing one or more routines, thresholds and captured data. The one or more routines may be executed by the processor to perform steps for determining the location of the capture resonator 18 relative to the source resonator 24. The location controller 42 may be further configured to perform the following functions including, but not limited to: calibrating the vehicle 16 make and model to its correlated wireless charger location of the capture resonator 18 mounted to the underside 20 of the vehicle 16, filtering the location signal to deliver a stable and reliable user interface output, and performing a system redundancy check to validate the magnetic sensor 40 output accuracy.

Returning now to FIG. 1, the system 10 may include a controller 44, hereafter referred to as the charging controller 44, for controlling the charging signal 28 that determines how much energy is emitted by the source resonator 24. The charging controller 44 also controls the beacon signal 38. The charging controller 44 may include a processor (not shown) such as a microprocessor or other control circuitry as should be evident to those in the art. The charging controller 44 may also include a radio frequency (RF) transceiver 46 able to communicate with the vehicle 16 in order to determine a state of charge of the battery 14 and to transmit other information regarding the charging process. The charging controller 44 may also include memory (not shown), including non-volatile memory, such as electrically erasable programmable read-only memory (EEPROM) for storing one or more routines, thresholds and captured data. The one or more routines may be executed by the processor to perform steps for determining if RF signals received by the charging controller 44 indicate that the battery 14 needs charging. The charging controller 44 may also be in communication with sensors (not shown) and may execute routines to determine whether a vehicle 16 is within range of the source resonator 24. The charging controller 44 may also execute routines to control the current sent to the source resonator 24 by the power source 26. The charging controller 44 may be programmed to command the power source 26 to provide the electric current sufficient for the source resonator 24 to emit the beacon signal 38 when a vehicle 16 is detected within proximity of the source resonator 24, that is the vehicle 16 is at a distance less than a distance threshold. This distance threshold may be, for example, 6 meters (19.68 feet). Proximity sensor used to detect a vehicle 16 in proximity to the source resonator 24 may include ultrasonic sensors, magnetic loop sensors, pneumatic sensors, or other proximity sensors well known to those skilled in the art.

The charging controller 44 may be in communication with the location controller 42 via the RF communication link and the charging controller 44 may be programmed to command the power source 26 to provide the electric current sufficient to emit the charging signal 28 when the location controller 42 determines that the source resonator 24 and capture resonator 18 are sufficiently aligned. The charging controller 44 may also be programmed to command the power source 26 to provide the electric current sufficient to emit the charging signal 28 when the charging controller 44 receives an input from a user to commence the charging process.

According to one embodiment, the charging controller 44 may execute routines that command the magnitude of the electric current supplied by the power source 26 to be constant when the source resonator 24 emits the beacon signal 38 and may command the magnitude of the electric current supplied by the power source 26 to be time-variant when the source resonator 24 emits the charging signal 28. That is, the power source 26 supplies alternating current (AC) to the source resonator 24 when the source resonator 24 emits the charging signal 28 and supplies direct current (DC) to the source resonator 24 when the source resonator 24 emits the beacon signal 38. Thus, the magnetic beacon signal 38 produces a constant magnetic field around the source resonator 24 while the charging signal 28 produces a magnetic field around the source resonator 24 that varies over time in proportion with the change in magnitude of the current. A constant magnetic field produced by the source resonator 24 may be well suited for use with a fluxgate magnetometer because it may be similar to the magnetic field produced by a permanent magnet. Vehicle guidance systems based on the use of permanent magnets and magnetic flux gate sensors are described in California PATH Research Report UCB-ITS-PRR-2005-23 "Demonstration of Automated Heavy-Duty Vehicles" by Shaldover et al. published by the University of California, Berkley, Calif., June 2005, the entire disclosure of which is hereby incorporated by reference.

In another embodiment, charging controller 44 may execute routines that command the power source 26 to vary the magnitude of the electric current over time at a designated frequency when either the charging signal 28 or the beacon signal 38 is transmitted. That is, the power source 26 supplies alternating current (AC) to the source resonator 24 when the source resonator 24 emits the charging signal 28 and when the source resonator 24 emits the beacon signal 38. It should be readily apparent that frequency of the alternating current of the power source 26 will determine the frequency of the charging signal 28 and the beacon signal 38. Therefore, the frequency of the charging signal 28 and the frequency of the beacon signal 38 will depend on the frequency of the electric current. The frequency of the charging signal 28 is preferably at or near the resonant frequency of the capture resonator 18. The frequency of the charging signal 28 may be substantially higher than the frequency of the beacon signal 38. In this embodiment, the beacon signal 38 frequency may be outside a resonant frequency range of the capture resonator 18. Vehicle guidance systems based on the use of low frequency magnetic signals and magnetoresistive sensors are described in a thesis "A Positioning System with No Line-Of-Sight Restrictions for Cluttered Environments" by Eric Prigge, published by Stanford University, Palo Alto, Calif., August 2004, the entire disclosure of which is hereby incorporated by reference.

Figure 4:
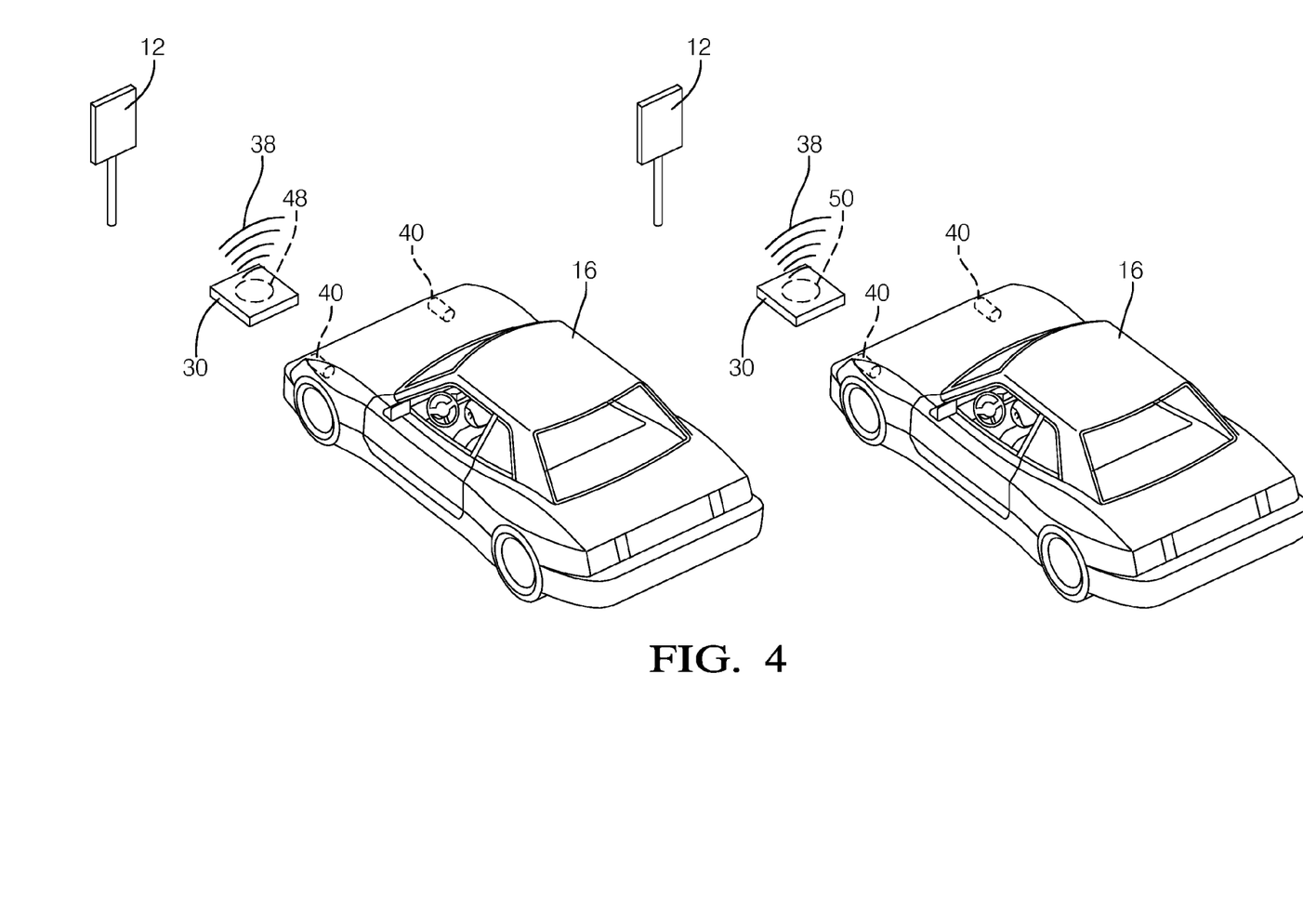
FIG. 4 is a perspective view of a system to align a source resonator and a capture resonator being used to park two different vehicles in accordance with another embodiment.

According to another non-limiting example illustrated in FIG. 4, the charging controller 44 may execute routines that command the power source 26 to vary the current sent to the source resonator 24 so as to encode the beacon signal 38 so that the location controller 42 may distinguish the beacon signal 38 from one source resonator 48 from the beacon signal 38 from a different source resonator 50. This may be beneficial in locations wherein there are multiple charging stations having multiple source resonators 48, 50. The beacon signal 38 of a first source resonator 48 may be pulse modulated using a different pulse pattern than the beacon signal 38 of a second source resonator 50. The charging controller 44 may transmit the expected pulse pattern to the vehicle 16 over the RF transceiver 46 when the charging controller 44 detects a vehicle 16 in proximity of the first source resonator 24.

Alternatively, the beacon signal 38 of the first source resonator 48 may be frequency modulated with a different frequency modulated signal than the beacon signal 38 of a second source resonator 50. Similarly, the charging controller 44 may transmit the expected signal to the vehicle 16 over the RF transceiver 46 when the charging controller 44 detects a vehicle 16 in proximity of the first source resonator 24. Other methods of modulating a first and second beacon signal 38 so that a location controller 42 may distinguish between the two signals may also be envisioned.

As illustrated in FIG. 1, the capture resonator 18 and the magnetic sensor 40 may be attached to vehicle 16. The location controller 42 may also be located within the vehicle 16. Alternately, the location controller 42 may be incorporated into the charging controller 44 and the magnetic sensor 40 may communicate with the location controller 42 via the RF communication link.

As illustrated in FIG. 2, the system 10 may include an array of magnetic sensors 40 attached to the vehicle 16. The array of magnetic sensors 40 provides a plurality of output signals to the location controller 42. The location controller 42 may be further configured to determine a relative position between the source resonator 24 and the capture resonator 18 by processing the plurality of output signals using signal location techniques such as directional triangulation, time of arrival, or other signal location processing techniques well-known to those skilled in the art. A first portion 52 of the array of magnetic sensors 40 may be attached to the vehicle 16 forward of the capture resonator 18. The first portion 52 of the array of sensors may be placed symmetrically along the lateral axis of the vehicle 16. This sensor arrangement may ensure that the location controller 42 receives a higher degree of contrast between the plurality of outputs from the sensors. Also, because the vehicle 16 will likely be driving into the parking location front end first, the magnetic field is strongest and easiest to detect at the front of the vehicle 16. The magnetic sensors 40 may also be placed as far apart from each other as possible given the mounting constraints on the vehicle 16 in order to provide the greatest differential between the received beacon signals for each of the magnetic sensors 40. Additionally, a second portion 54 of the array of magnetic sensors 40 may be attached to the vehicle 16 rearward of the capture resonator 18. This may improve the accuracy of determining the location of the source resonator 24 relative to the capture resonator 18 once the vehicle 16 is over the source resonator 24. The second portion 54 may also provide additional sensor redundancy and signal filtration capabilities.

The system 10 may further include a display 56 in communication with the location controller 42. The display 56 may provide a graphic indication of the movement required by the vehicle 16 to align the capture resonator 18 and the source resonator 24, based on the alignment signal. The display 56 may be located inside the vehicle 16 in a location visible to a vehicle operator, such as the vehicle center stack The display 56 may be part of another display system, for example a vehicle navigation display. Alternatively, the display 56 may be located outside of the vehicle 16, perhaps in a location in front of the parking spot that is visible to the operator of the vehicle 16.

While the embodiments illustrated are applied to a system 10 to align a source resonator 24 with a capture resonator 18 attached to a vehicle 16, this system 10 is not limited to the illustrated application and may be applied to other applications, such as aligning a cellular telephone having a capture resonator with a source resonator within a charging pad.

Accordingly, a system 10 for aligning a source resonator 24 and a capture resonator 18 is provided. The system 10 emits a magnetic beacon signal 38 that can be used with magnetic sensors 40 to guide a user to align a capture resonator 18 with a source resonator 24 in order to maximize electrical power transfer between the resonators 18, 24. The system 10 provides the benefit of providing the magnetic beacon signal 38 without adding additional components to the source resonator 24, a charge pad 30 containing the source resonator 24, or the wireless battery charger 12.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A system to provide alignment between a source resonator and a capture resonator, said system comprising:
   a source resonator configured to emit a magnetic signal selected from a group consisting of a charging signal and a beacon signal;
   a capture resonator configured to wirelessly receive the charging signal and provide electrical power based on the charging signal;
   a magnetic sensor configured to wirelessly receive the beacon signal and provide a location signal based on the beacon signal that is indicative of a relative location between the source resonator and the capture resonator; and
   a controller in communication with said magnetic sensor, said controller configured to receive the location signal and provide an alignment signal indicative of a movement required to align the source resonator and the capture resonator, wherein said source resonator is coupled to an electrical power source that provides an electric current to the source resonator, the source resonator emits the charging signal when a magnitude of the electric current exceeds a first current threshold, and the source resonator emits the beacon signal when the magnitude of the electric current is below a second current threshold.

2. The system according to claim 1, wherein the first current threshold is substantially higher than the second current threshold.

3. The system according to claim 1, wherein the magnitude of the electric current is constant when the source resonator emits the beacon signal and the magnitude of the electric current is time-variant when the source resonator emits the charging signal.

4. The system according to claim 3, wherein the beacon signal is pulse modulated.

5. The system according to claim 1, wherein the magnitude of the electric current is time-variant and a charging signal frequency is substantially higher than a beacon signal frequency.

6. The system according to claim 5, wherein the beacon signal frequency is not a resonant frequency of the capture resonator.

7. The system according to claim 5, wherein the beacon signal is frequency modulated.

8. The system according to claim 2, wherein said capture resonator and said magnetic sensor are disposed on a vehicle.

9. The system according to claim 8, wherein the system further includes an array of magnetic sensors disposed on the vehicle, said array of magnetic sensors provides a plurality of output signals and wherein the controller is further configured to determine a relative position between the source resonator and the capture resonator by processing the plurality of output signals.

10. The system according to claim 9, wherein a first portion of the array of magnetic sensors is disposed on the vehicle forward of the capture resonator.

11. The system according to claim 9, wherein a second portion of the array of magnetic sensors is disposed on the vehicle rearward of the capture resonator.

12. The system according to claim 8, wherein the system further includes a display in communication with the controller, said display providing a graphic indication of the movement required by the vehicle to align the capture resonator and the source resonator, based on the alignment signal.

13. The system according to claim 8, wherein the electrical power provided by the capture resonator charges a battery disposed within the vehicle.

14. A device configured to provide a signal for locating a source resonator relative to a capture resonator, said device comprising:

an electrical power source that provides an electric current; and a source resonator coupled to said electrical power source to receive the electric current, wherein said source resonator is configured to transmit a magnetic charging signal to a capture resonator that wirelessly receives the magnetic charging signal and provides electrical power based on the magnetic charging signal and wherein said source resonator is configured to transmit a magnetic beacon signal to a magnetic sensor that wirelessly receives the magnetic beacon signal and provides a location signal based on the magnetic beacon signal that is indicative of a relative location between the source resonator and the capture resonator, wherein said source resonator emits the magnetic charging signal when a magnitude of the electric current exceeds a first current threshold and the source resonator emits the magnetic beacon signal when the magnitude of the electric current is below a second current threshold.

15. The device according to claim 14, wherein the first current threshold is substantially higher than the second current threshold.

16. The device according to claim 14, wherein the magnitude of the electric current is constant when the source resonator emits the magnetic beacon signal and the magnitude of the electric current is time-variant when the source resonator emits the magnetic charging signal.

17. The device according to claim 16, wherein the magnetic beacon signal is pulse modulated.

18. The device according to claim 14, wherein the magnitude of the electric current is time-variant and a charging signal frequency is substantially higher than a beacon signal frequency.

19. The device according to claim 17, wherein the magnetic beacon signal is frequency modulated.

20. The device according to claim 14, wherein the device is configured to transmit the magnetic charging signal to a capture resonator that is disposed in a vehicle and transmit the magnetic beacon signal to a magnetic sensor that is disposed in said vehicle.

* * * * *